(12) United States Patent
Picco et al.

(10) Patent No.: US 9,611,418 B2
(45) Date of Patent: Apr. 4, 2017

(54) RHEOLOGY MODIFIER FOR DRILLING AND WELL TREATMENT FLUIDS

(71) Applicant: LAMBERTI SPA, Albizzate (VA) (IT)

(72) Inventors: Cristina Maria Picco, Oleggio (IT); Massimo Cecchetto, Oggiona con Santo Stefano (IT); Pierangelo Pirovano, Comerio (IT); Luigi Merli, Saronno (IT); Giovanni Floridi, Novara (IT); Giuseppe Li Bassi, Gavirate (IT)

(73) Assignee: LAMBERTI SPA, Albizzate (VA) (IT)

( * ) Notice: Subject to any disclaimer, the term of this patent is extended or adjusted under 35 U.S.C. 154(b) by 185 days.

(21) Appl. No.: 14/410,964

(22) PCT Filed: Jun. 20, 2013

(86) PCT No.: PCT/EP2013/062894
§ 371 (c)(1),
(2) Date: Dec. 23, 2014

(87) PCT Pub. No.: WO2014/001192
PCT Pub. Date: Jan. 3, 2014

(65) Prior Publication Data
US 2015/0152313 A1    Jun. 4, 2015

(30) Foreign Application Priority Data

Jun. 25, 2012  (IT) .............................. VA2012A0022

(51) Int. Cl.
| | | |
|---|---|---|
| *C09K 8/36* | (2006.01) | |
| *C09K 8/42* | (2006.01) | |
| *C09K 8/64* | (2006.01) | |
| *C09K 8/82* | (2006.01) | |
| *E21B 43/16* | (2006.01) | |
| *C09K 8/502* | (2006.01) | |
| *E21B 7/00* | (2006.01) | |
| *E21B 31/03* | (2006.01) | |

(52) U.S. Cl.
CPC .................. *C09K 8/36* (2013.01); *C09K 8/42* (2013.01); *C09K 8/502* (2013.01); *C09K 8/64* (2013.01); *C09K 8/82* (2013.01); *E21B 7/00* (2013.01); *E21B 43/16* (2013.01); *C09K 2208/02* (2013.01); *E21B 31/03* (2013.01)

(58) Field of Classification Search
None
See application file for complete search history.

(56) References Cited

U.S. PATENT DOCUMENTS

| | | | |
|---|---|---|---|
| 4,978,392 A | 12/1990 | Kilbarger et al. | |
| 6,908,887 B2 | 6/2005 | Thaemlitz | |
| 7,345,010 B2 | 3/2008 | Thompson et al. | |
| 7,871,962 B2 | 1/2011 | Patel et al. | |
| 2008/0015118 A1* | 1/2008 | Oyler | C09K 8/32 507/138 |
| 2009/0227478 A1* | 9/2009 | Dino | C09K 8/035 507/118 |
| 2011/0257051 A1* | 10/2011 | Welton | C09K 8/502 507/220 |
| 2014/0100304 A1* | 4/2014 | Cadix | C09K 8/508 523/130 |

* cited by examiner

*Primary Examiner* — John J Figueroa
(74) *Attorney, Agent, or Firm* — Mossman, Kumar & Tyler, PC

(57) ABSTRACT

Water in oil emulsion drilling and well treatment fluids comprising an ester of trimer fatty acids and polyoxyethyiene glycol, the polyoxyethyiene glycol having average molecular weight from about (150) to about (600) and the trimer acids having at least about 20% of carboxyl acid groups esterified, as rheology modifier.

11 Claims, No Drawings

RHEOLOGY MODIFIER FOR DRILLING AND WELL TREATMENT FLUIDS

FIELD OF THE INVENTION

The present invention relates to a rheology modifier for water in oil emulsion drilling and well treatment fluids (invert emulsion fluids) with improved environmental compatibility, and to its use as thickener of invert emulsion fluids in subterranean applications; more particularly, the rheology modifier is an ester of trimer fatty acids and polyoxyethylene glycol, the trimer acids having at least about 20% of carboxyl acid groups esterified.

Drilling fluids are meant to include drilling and completion fluids; well treatment fluids are meant to include all fluids used in well operations such as work-over, milling, stimulation, fracturing, spotting fluids, cementing, etc. Invert emulsion fluids are here meant to designate both drilling fluids and well treatment fluids in which the continuous phase is oleaginous (water in oil emulsion fluids).

Invert emulsions fluids are also here referred to as oil based fluids.

STATE OF THE ART

Emulsions usually comprise two immiscible phases: a continuous (or external) phase and a discontinuous (or internal) phase, the discontinuous phase usually being a liquid dispersed in droplets in the continuous phase.

Oil-in-water emulsions usually include a fluid at least partially immiscible in oil (an aqueous-based fluid) as the continuous phase and an oil phase as the discontinuous phase.

Water-in-oil emulsions are the opposite, having the oil phase as the continuous phase and a fluid at least partially immiscible in the oil phase (usually an aqueous-based fluid) as the discontinuous phase.

Water-in-oil emulsions may also be referred to as invert emulsions. Both kinds of emulsions have been used widely in oil and gas applications, for instance, for drilling and other subterranean treatment applications.

Invert emulsions are preferred as drilling fluids when the formation is remarkably sensitive to contact with water and they usually guarantee better lubrication of the drill strings and downhole tools, thinner filter cake formation, and better thermal resistance and hole stability.

Invert emulsion fluids are generally viscosified by addition of one or more rheology modifying agents that should be able to control the rheology of the fluid in the whole range of operating temperatures, solids concentrations and applied shear rate.

One of the functions of the rheology modifiers is in fact to suspend cuttings, especially when the fluid is at rest.

Many rheology modifiers for oil based fluids are known.

By way of example, U.S. Pat. No. 6,908,887 (assigned to Halliburton) describes the use of the condensation product of a dimer or trimer fatty acid and diethanolamine as suspending agent for oil-based drilling fluids.

U.S. Pat. No. 7,345,010 (assigned to Elementis Specialties) reports that the use of additives based on the reaction product of polyamines and polycarboxylic acids combined with alkoxylated amines and fatty acid amides provide stable rheological properties independently from temperature variations.

Fatty trimer acids are among the known rheology modifiers that are used in drilling and well treatment fluids.

U.S. Pat. No. 7,871,962 (assigned to M I LLC.) describes oil based drilling muds comprising a rheology modifier that may be a dimer, trimer or tetramer of a $C_{12}$-$C_{22}$ fatty acid, or a fatty polyamide.

However, the use of trimer acids is problematic, as they suffer from problems that include possible aquatic toxicity and poor biodegradability.

As a matter of fact, favorable eco-toxicity data are required for offshore chemical products to reduce the potential environmental risk in the marine environment.

In particular, bioaccumulation data, biodegradation data and aquatic toxicity data from three trophic levels (algae, crustacea and fish) are required to predict the potential hazard for the ecosystem. Bioaccumulation data must be provided for all organic substances, with the exception of surfactants and substances of high molecular weight.

It has now been found that water in oil emulsion drilling and well treatment fluids comprising an ester of trimer fatty acids and polyoxyethylene glycol having average molecular weight from about 150 to about 600, the trimer acids having at least about 20% of carboxyl acid groups esterified, show increased viscosity and good environmental compatibility because of their low aquatic toxicity and high biodegradability.

Esters of trimer fatty acids and a polyoxyethylene glycol have been described in U.S. Pat. No. 4,978,392, that discloses the use of an ester derived from a polyoxyethylene glycol and a polycarboxylic acid to improve the fluidity and dispersability of cementitious compositions.

SUMMARY OF THE INVENTION

The object of this invention is the use of certain esters of trimer fatty acids (Fatty acids, $C_{18}$-unsaturated, trimers; CAS No. 68937-90-6) and polyoxyethylene glycol (CAS No. 25322-68-3) as rheology modifier for invert emulsions fluids.

In one embodiment, the present invention provides a water in oil emulsion drilling fluid or well treatment fluid that comprises a continuous oil phase, an aqueous internal phase and an ester of trimer fatty acids and polyoxyethylene glycol, the polyoxyethylene glycol having average molecular weight from about 150 to about 600 and the trimer acids having at least about 20% of carboxyl acid groups esterified, as rheology modifier.

In another embodiment, the present invention provides a method for drilling a well bore in a subterranean formation using a water in oil emulsion drilling fluid comprising a continuous oil phase, an internal aqueous phase and an ester of trimer fatty acids and a polyoxyethylene glycol, the polyoxyethylene glycol having average molecular weight from about 150 to about 600 and the trimer acids having at least about 20% of carboxyl acid groups esterified, as rheology modifier.

In yet another embodiment, the present invention provides a method of treating oil wells that comprises: providing a water in oil emulsion well treatment fluid containing a continuous oil phase, an internal aqueous phase and an ester of trimer fatty acids and polyoxyethylene glycol, the polyoxyethylene glycol having average molecular weight from about 150 to about 600 and the trimer acids having at least about 20% of carboxyl acid groups esterified, as rheology modifier.

In a further embodiment, the present invention provides a method of fracturing a subterranean formation that comprises: providing a water in oil emulsion fluid containing an oil phase, an aqueous phase, an ester of trimer fatty acids and polyoxyethylene glycol, the polyoxyethylene glycol having average molecular weight from about 150 to about 600 and the trimer acids having at least about 20% of carboxyl acid groups esterified, and proppant particulates; placing the water in oil emulsion fluid into the subterranean formation at a pressure sufficient to create or enhance at least one fracture therein; and removing the water in oil emulsion fluid from the subterranean formation while leaving at least a portion of the proppant particulates in the fracture.

The features and advantages of the present invention will be readily apparent to those skilled in the art upon reading of the description of the preferred embodiments which follows.

DETAILED DESCRIPTION OF THE INVENTION

Trimer fatty acids are mixtures of trimers and dimers of $C_{18}$-unsaturated fatty acids containing about 60% of trimers and about 40% by weight of dimers. Trimer fatty acids, also simply named trimers, are obtained by distillation of crude dimer acids (CAS No. 71808-39-4). Dimer and trimer fatty acids are respectively $C_{36}$ and $C_{54}$ predominantly monocyclic addition compounds of unsaturated fatty acids (primarily of tall oil fatty acids).

For the preparation of the ester of the present invention, trimer fatty acids comprising from about 50% to about 100% by weight of trimers of $C_{18}$-unsaturated fatty acids shall be used, the balance to 100% mainly consisting of dimers of $C_{18}$-unsaturated fatty acids.

The polyethylene glycols that may be used in the preparation of the esters of the invention have average molecular weight from about 150 to about 600, preferably from 150 to 250, as determined from the hydroxyl number measured according to ASTM test method D4274-05.

In order to perform as thickener in invert emulsion fluids, the ester of trimer fatty acids and polyoxyethylene glycol shall be soluble in the continuous oil phase. As a consequence, the molecular weight of the polyethylene glycol and the percentage of carboxyl acid groups of trimer fatty acids which are esterified shall be regulated accordingly.

The use of polyoxyethylene glycol with average molecular weight from 150 to 250 and esters in which from 25% to 50% of the carboxyl acid groups of trimer fatty acids are esterified is preferred. Best results have been obtained with polyoxyethylene glycol with average molecular weight of about 200 and with esters in which from 30 to 40% of the carboxyl acid groups of the trimer fatty acids are esterified.

The percentage of esterified carboxyl groups may be determined by methods known in the art, such as the standard test method ASTM D5558-95 "STANDARD TEST METHOD FOR DETERMINATION OF THE SAPONIFICATION VALUE OF FATS AND OILS" and by ASTM D974-12 "ACID AND BASE NUMBER BY COLOR-INDICATOR TITRATION" (the percentage can be calculated from the saponification value and the acid number of the ester).

The water in oil emulsion drilling and well treatment fluids according to the invention contain from 0.1 to 10% by weight of ester, based on the total weight of the fluid.

In a preferred embodiment, the ester is used in a quantity of 0.5 to 5% by weight, in order to optimally develop its effect as thickener.

Before being added to the water in oil emulsion drilling or well treatment fluid, the ester may be diluted in a suitable solvent, such as a glycol or a glycol ether, for example in butyltriglycol.

The use of an ester of trimer fatty acids and polyoxyethylene glycol, the polyoxyethylene glycol having average molecular weight from about 150 to about 600 and the trimer acids having at least about 20% of the carboxyl acid groups esterified, as rheology modifier of water in oil emulsion drilling and well treatment fluids leads to a remarkably increased viscosity of the fluids when a comparison is made with that of the same fluid without the ester and also with that of the same fluid comprising commercially available thickeners, and in particular trimer fatty acids. Moreover it will be appreciated that invert emulsions fluids thickened with the esters of the invention show a stable rheology, i.e. a rheology profile with little variation before and after heat aging of the fluid.

The water in oil emulsion drilling fluids of the present invention comprise a continuous oil phase, an internal aqueous phase (a water based fluid that is at least partially immiscible with the oil phase), and the above described ester and may be suitable for use in a variety of oil field applications wherein water-in-oil emulsions are used; these include subterranean applications comprising drilling, completion and stimulation operations (such as fracturing), sand control treatments such as installing a gravel pack, cementing, maintenance and reactivation.

The water in oil emulsion drilling fluids or well treatment fluids of the invention comprise from 50 to 98% by weight, preferably from 80 to 98% by weight, of a continuous oil phase and from 2 to 50% by weight, preferably from 2 to 20% by weight of an internal aqueous phase.

The continuous oil phase used in the invert emulsions of the present invention may comprise any oil-based fluid suitable for use in emulsions.

The oil-based fluid may derive from a natural or synthetic source.

Examples of suitable oil-based fluids include, without limitation, diesel oils, paraffin oils, mineral oils, low toxicity mineral oils, olefins, esters, amides, amines, synthetic oils such as polyolefins, ethers, acetals, dialkylcarbonates, hydrocarbons and combinations thereof.

The preferred oil-based fluids are paraffin oils, low toxicity mineral oils, diesel oils, mineral oils, polyolefins, olefins and mixtures thereof.

Factors determining which oil phase will be used in a particular application, include but are not limited to, its cost and performance characteristics, environmental compatibility, toxicological profile and availability.

The invert emulsion fluids of the present invention also comprise an internal aqueous phase that is at least partially immiscible with the oil phase.

Suitable examples of the aqueous phase include fresh water, sea water, salt water, and brines (e.g., saturated salt waters), glycerine, glycols, polyglycol amines, polyols and derivatives thereof, that are partially immiscible with the oleaginous fluid, and combinations thereof.

Suitable brines may include heavy brines.

Heavy brines, for the purposes of this application, include brines with various salts at variable concentrations, that may be used to weight up a fluid; generally the use of weighting agents is required to provide the desired density of the fluid.

Barite, calcium carbonate, dolomite, ilmenite, hematite, ground marble, limestone and mixture thereof are examples of suitable weighting agents. Brines generally comprise water soluble salts.

Suitable water soluble salts are sodium chloride, calcium chloride, calcium bromide, zinc bromide, sodium formate, potassium formate, sodium acetate, potassium acetate, calcium acetate, ammonium acetate, ammonium chloride, ammonium bromide, sodium nitrate, potassium nitrate, ammonium nitrate, calcium nitrate, sodium carbonate, potassium carbonate, and mixtures thereof.

The aqueous phase is chosen taking into account several factors including cost, environmental and health safety profile, density, availability, and which oil phase has been chosen. Another factor that may be considered is the application of the emulsion.

For example, if the application needs an emulsion with a heavy weight, a zinc bromide brine (for example) may be chosen.

The water in oil drilling and well treatment fluids of the invention may further comprise conventional additives including emulsifiers, weighting agents, wetting agents, fluid loss agents, thinning agents, lubricants, anti-oxidants, corrosion inhibitors, scale inhibitors, defoamers, biocides, pH modifiers, and the like.

Such fluids, in particular, also contain at least one filtrate reducer preferably chosen among gilsonite, organophilic lignite, organophilic tannins, synthetic polymers, polycarboxylic fatty acids, or mixture thereof.

When used in certain applications, the fluids may include particulates such as proppants or gravel.

To better illustrate the invention, the following examples are reported to show the effect of the addition of the esters of the invention in exemplary water in oil emulsion drilling fluids.

EXAMPLES

Preparation of a Polyoxyethylene Glycol Partial Ester of Trimer Acids (Ester 1)

In a reaction vessel equipped with heating, stirrer, thermometer, a system of introduction of the reagents, the reaction vessel being connected to a cooler provided with a collector of water, 2469 g of trimer acids and 531 g of polyoxyethylene glycol (MW 200) are added. At about 40° C., 3 g of p-toluenesulphonic acid monohydrate are added under stirring. The temperature is set at 120° C. The reaction mixture is maintained at 120° C. until the acidity number reaches a value between 95 and 105 mg KOH/g.

The product (Ester 1) is then diluted with butyltriglycol (triethylene glycol monobutyl ether) and cooled, to obtain a 80% by weight solution of the partial ester (RM1).

Marine Ecotoxicity Data of Ester 1

The Marine Biodegradation of Ester 1 was measured according to the OECD 306 Test. The Aquatic Ecotoxicity of Ester 1 was evaluated for the following species (according to the method in parenthesis):

Algae (test protocol for *Skeletonema costatum* ISO/DIS 10253).
Crustacea (test protocol for *Acartia tonsa* ISO TC 147/SC5/WG2).
Fish (recommended test protocol PARCOM Protocol 1995 part B).
Sediment reworker (recommended test protocol PARCOM Protocol 1995 part A).

The following are the results of the tests performed on Ester1:

Marine biodegradation >60% (70 days)
Aquatic Ecotoxicity (Algae) $EC_{50}$>1000 mg/l
Aquatic Ecotoxicity (Crustacea) $LC_{50}$>1000 mg/l
Aquatic Ecotoxicity (Fish) $LC_{50}$>1000 mg/l
Aquatic Ecotoxicity (Sediment reworker) $LC_{50}$>1000 mg/l Preparation of a Polyoxyethylene Glycol Ester Rheology of Trimer Acids (Ester 2)

In a reaction vessel equipped with heating, stirrer, thermometer, a system of introduction of the reagents, the reaction vessel being connected to a cooler provided with a collector of water, 180.9 g of trimer acids and 117 g of polyoxyethylene glycol (MW 200) are added. At about 40° C., 0.91 g of p-toluenesulphonic acid monohydrate are added under stirring. The temperature is set at 120° C. The reaction mixture is maintained at 120° C. for 2 hours. After this step, the temperature is increased to 140° C. and the reaction mixture is maintained at this temperature until the acidity number reaches a value below 5 mg KOH/g. The product (Ester 2) is then diluted with butyltriglycol (triethylene glycol monobutyl ether) and cooled, to obtain a 80% by weight solution of the ester (RM2).

Application Tests

Example 1

Three water in oil emulsion fluids were prepared by mixing the here below ingredients with an Hamilton Beach mixer, as described in A.P.I. Specification 13B-2, in the reported order and with the following stirring times:

| Ingredients | g in the fluid | Stirring time |
|---|---|---|
| EDC 99-DW (*) | 165.6 | |
| Emulsifier | 9.8 | 10 min |
| Bentone 38 (**) | 5.95 | 10 min |
| Rheology modifier | 0.7 | 5 min |
| Ca(OH)$_2$ | 7 | 10 min |
| Brine CaCl$_2$ 18.6% | 62.68 | 10 min |
| Barite | 303 | 20 min |

(*) mineral paraffinic oil available from TOTAL UK.
(**) organophilic clay available from Elementis The rheology modifiers RM1 and RM2 and trimer fatty acids available from Oleon diluted with butyltriglycol (triethylene glycol monobutyl ether) to obtain a 80% by weight solution (RM3) were used as the rheology modifiers respectively in Fluid 1, Fluid 2 and Fluid 3.

A blank water in oil fluid was prepared with the same operating mode and recipe, but without the addition of any rheology modifier (Blank Fluid).

The characteristics of the fluids are shown in the following table:

| | Units | |
|---|---|---|
| Oil/water | v/v | 80/20 |
| Density | g/ml | 1.56 |
| Specific weight | ppg$^{(*)}$ | 13.0 |

$^{(*)}$pounds per gallon (1 ppg = 119 kg/m$^3$)

The rheological properties of the invert emulsion drilling fluids were measured at 50° C. with a viscometer, as reported in ISO standard 10414-2.

Electrical stability has been measured at a temperature of 50° C. by means of an electrical stability meter as reported in ISO standard 10414-2.

The results are reported in Table 1

It can be observed that the use of a polyoxyethylene glycol ester of trimer fatty acids leads to a remarkably increased viscosity.

TABLE 1

Rheological properties at 50° C.

|  | Units | Blank fluid* | Fluid 1 | Fluid 2 | Fluid 3* |
|---|---|---|---|---|---|
| Rheology | | | | | |
| 600 rpm |  | 64 | 116 | 76 | 78 |
| 300 rpm |  | 35 | 80 | 51 | 47 |
| 200 rpm |  | 24 | 65 | 42 | 35 |
| 100 rpm |  | 14 | 48 | 32 | 22 |
| 6 rpm |  | 4 | 24 | 17 | 8 |
| 3 rpm |  | 3 | 22 | 16 | 7 |
| gels 10" | lbs/100 ft$^2$** | 3 | 22 | 20 | 11 |
| gels 10' | lbs/100 ft$^2$** | 4 | 28 | 30 | 37 |
| AV | mPa * s | 32 | 58 | 38 | 39 |
| PV | mPa * s | 29 | 36 | 25 | 31 |
| YP | lbs/100 ft$^2$** | 6 | 44 | 26 | 16 |
| Electrical stability @ 50° C. | | | | | |
| | volts | 760 | 1020 | 1010 | 970 |

*comparative
**1 lbs/100 ft = 47.88 Pa

Example 2

To study the behaviour of the rheology modifier in a different system, another test was analogously conducted in another mineral oil based fluid prepared by mixing the here below ingredients with an Hamilton Beach mixer as described in A.P.I. Specification 13B-2, in the reported order and with the following stirring times.

| Ingredients | g in the fluid | Stirring time |
|---|---|---|
| Clairsol NS (*) | 189.7 | |
| Emulsifier | 9 | 10 min |
| Geltone II (**) | 6 | 10 min |
| Duratone HT (***) | 9 | 5 min |
| RM1 | 1 | 5 min |
| Ca(OH)$_2$ | 7 | 10 min |
| Brine CaCl$_2$ 20% | 79.25 | 10 min |
| Barite | 292.6 | 20 min |

(*) mineral paraffinic oil available from Carless Petrochem.
(**) organophilic clay available from Baroid
(***) Obm fluid loss reducer available from Baroid The characteristics of the Blank Fluid and of the fluid containing RM1 (Fluid 1a) are shown in the table here below.

| | Units | |
|---|---|---|
| Oil/water | v/v | 80/20 |
| Density | g/ml | 1.6 |
| Specific weight | ppg$^{(*)}$ | 13.3 |

$^{(*)}$pounds per gallon (1 ppg = 119 kg/m$^3$)

The rheological properties of the invert emulsion drilling fluids were measured at 50° C. before and after hot rolling (BHR and AHR) with a viscometer, as reported in ISO standard 10414-2.

Electrical stability has been measured at a temperature of 50° C. by means of an electrical stability meter as reported in ISO standard 10414-2.

The following operating conditions were used:

| Operating conditions | Units | |
|---|---|---|
| Aging period | hours | 16 |
| Aging temperature | ° C. | 120 |
| Dynamic/Static aging | D/S | D |

The results are reported in Table 2 and 3

TABLE 2

Rheological properties BHR

|  | Units | Blank Fluid* | Fluid 1a |
|---|---|---|---|
| Rheology | | | |
| 600 rpm |  | 56 | 58 |
| 300 rpm |  | 33 | 37 |
| 200 rpm |  | 25 | 29 |
| 100 rpm |  | 17 | 21 |
| 6 rpm |  | 8 | 10 |
| 3 rpm |  | 7 | 9 |
| gels 10" | lbs/100 ft$^2$** | 9 | 9 |
| gels 10' | lbs/100 ft$^2$** | 11 | 14 |
| AV | mPa * s | 28 | 29 |
| PV | mPa * s | 23 | 21 |
| YP | lbs/100 ft$^2$** | 10 | 16 |
| Electrical stability @ 50° C. | | | |
| | volts | 500 | 700 |

*comparative
**1 lbs/100 ft = 47.88 Pa

TABLE 3

Rheological properties AHR for 16 hours at 120° C.

|  | Units | Blank fluid* | Fluid 4 |
|---|---|---|---|
| Rheology | | | |
| 600 rpm |  | 54 | 56 |
| 300 rpm |  | 32 | 36 |
| 200 rpm |  | 24 | 26 |
| 100 rpm |  | 17 | 18 |
| 6 rpm |  | 5 | 6 |
| 3 rpm |  | 4 | 5 |
| gels 10" | lbs/100 ft$^2$** | 5 | 6 |
| gels 10' | lbs/100 ft$^2$** | 5 | 11 |
| AV | mPa * s | 27 | 28 |
| PV | mPa * s | 22 | 20 |
| YP | lbs/100 ft$^2$** | 10 | 16 |
| Electrical stability @ 50° C. | | | |
| | volts | 480 | 700 |

*comparative
**1 lbs/100 ft = 47.88 Pa

It can be observed that the use of a polyoxyethylene glycol ester of trimer fatty acids leads to a remarkably increased viscosity and to a stable rheology, i.e. a rheology profile with little variation before and after heat aging of the fluid.

The invention claimed is:
1. A method for drilling or completing an oil or natural gas well employing a water in oil drilling fluid comprising introducing the water in oil drilling fluid into a well bore wherein the water in oil drilling fluid comprises:
   a continuous oil phase,
   an aqueous internal phase, and
   an ester of trimer fatty acids and polyoxyethylene glycol, and
wherein the polyoxyethylene glycol has an average molecular weight from about 150 to about 600 and the trimer acids comprise at least about 20% of carboxyl acid groups esterified;
and drilling or completing the oil or gas well.

2. The method for drilling or completing an oil or natural gas well of claim 1 wherein the ester is present at a concentration of from about 0.1 to about 10% by weight, based on the total weight of the fluid.

3. The method for drilling or completing an oil or natural gas well of claim 2 wherein the ester of trimer fatty acids and polyoxyethylene glycol has an average molecular weight from about 150 to about 250.

4. The method for drilling or completing an oil or natural gas well of claim 2 wherein the trimer acids have from about 25% to about 50% of carboxyl acid groups esterified.

5. The method for drilling or completing an oil or natural gas well of claim 1 wherein the water in oil drilling fluid comprises from about 50 to about 98% by weight of continuous oil phase and from 2 to 50% of internal aqueous phase.

6. A method for treating an oil or natural gas well employing a water in oil treatment fluid comprising introducing the water in oil treatment fluid into a well bore wherein the water in oil treatment fluid comprises:
   a continuous oil phase,
   an aqueous internal phase, and
   an ester of trimer fatty acids and polyoxyethylene glycol, and
wherein the polyoxyethylene glycol has an average molecular weight from about 150 to about 600 and the trimer acids comprise at least about 20% of carboxyl acid groups esterified.

7. The method for treating an oil or natural gas well of claim 6 wherein the ester is present at a concentration of from about 0.1 to about 10% by weight, based on the total weight of the fluid.

8. The method for treating an oil or natural gas well of claim 7 wherein the ester of trimer fatty acids and polyoxyethylene glycol has an average molecular weight from about 150 to about 250.

9. The method for treating an oil or natural gas well of claim 7 wherein the trimer acids have from about 25% to about 50% of carboxyl acid groups esterified.

10. The method for treating an oil or natural gas well of claim 6 wherein the water in oil drilling fluid comprises from about 50 to about 98% by weight of continuous oil phase and from 2 to 50% of internal aqueous phase.

11. The method for treating an oil or natural gas well of claim 6 wherein the treatment fluid is employed in operations selected from the group consisting of: work-over, milling, stimulation, fracturing, spotting, cementing, and combinations thereof.

* * * * *